United States Patent [19]

Fugleberg et al.

[11] 4,220,627

[45] Sep. 2, 1980

[54] PROCESS FOR THE TREATMENT OF RAW MATERIALS CONTAINING ARSENIC AND METAL

[75] Inventors: Sigmund P. Fugleberg; Stig-Erik Hultholm; Bror G. Nyman; Jussi K. Rastas, all of Pori, Finland

[73] Assignee: Outokumpu Oy, Helsinki, Finland

[21] Appl. No.: 956,487

[22] Filed: Nov. 1, 1978

[30] Foreign Application Priority Data

Nov. 28, 1977 [FI] Finland .................................. 773589

[51] Int. Cl.² ...................... C01G 3/10; C01G 51/10; C01G 53/10
[52] U.S. Cl. .......................................... 423/42; 423/1; 423/87; 423/146
[58] Field of Search ...................... 423/1, 42, 45, 146, 423/87

[56] References Cited

U.S. PATENT DOCUMENTS

| | | | |
|---|---|---|---|
| 1,863,807 | 6/1932 | Schopper | 423/87 |
| 4,061,564 | 12/1977 | De Schepper et al. | 423/87 |
| 4,102,976 | 7/1978 | Hiemeleers et al. | 423/87 |

FOREIGN PATENT DOCUMENTS 372189  5/1932  United Kingdom ...................... 423/87

*Primary Examiner*—Wayne A. Langel
*Attorney, Agent, or Firm*—Brooks, Haidt, Haffner & Delahunty

[57] ABSTRACT

A process for the treatment of raw materials which contain arsenic and metal to produce a metal-free arsenic product and an arsenic-free metal sulfate is disclosed, in which the raw material is leached by using an aqueous solution of sulfuric acid and then the metals are crystallized as sulfates from the separated aqueous solution, which is separated from the metal sulfate crystals. The leach is performed at elevated temperature under oxidizing conditions, in order to bring the arsenic to a 5-valent form, the metal sulfates are crystallized out from the selectively separated, arsenate-bearing aqueous solution by cooling, and arsenic is removed from at least part of this aqueous solution before the aqueous solution is returned to the leach.

10 Claims, 1 Drawing Figure

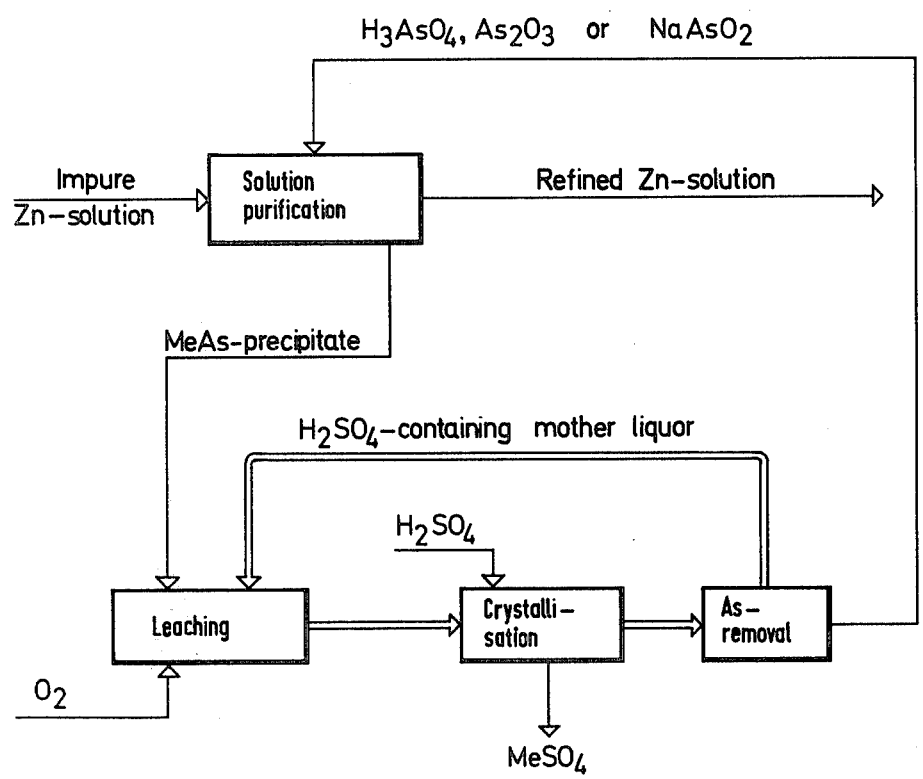

PROCESS FOR THE TREATMENT OF RAW MATERIALS CONTAINING ARSENIC AND METAL

BACKGROUND OF THE INVENTION

The present invention relates to the treatment of raw materials which contain arsenic and metal, in order to produce a metal-free arsenic product and an arsenic-free metal sulfate, by leaching the raw material with an aqueous solution of sulfuric acid and by crystallizing the metals in the form of sulfates from the separated aqueous solution, which is then separated from the metal sulfate crystals.

The process according to the invention can be used for the treatment of any arsenic- and metal-bearing raw materials the metals of which dissolve in a sulfuric acid solution in the form of sulfates and the arsenic of which can be recovered as a metal-free arsenic product, such as a solution of $H_3AsO_4$ or $NaAsO_2$, or solid $As_2O_3$. Suitable raw materials include metal arsenides and arsenates, such as the arsenides or thioarsenides of cobalt and nickel, and arsenic matte. A raw material especially suitable for treatment by the process according to the invention it the arsenic-bearing precipitate produced in the electrolytic zinc process; it is obtained by cementation by means of zinc powder and by the addition of some arsenic compound in order to cement the cobalt and nickel out from the zinc sulfate solution. As a result of this purification process a cementate is obtained in which the cobalt and nickel are in the form of arsenides (MeAs) and which also contains a small guantity of copper arsenides and metallic copper. This purification process is described in U.S. Pat. No. 3,979,266.

Cementates of the above type, produced by solution purification, used to have a high copper content and were therefore regarded as raw materials for copper production. Owing to their high arsenic content these raw materials were not, however, very desirable raw materials for smelting plants. There was another disadvantage in that the arsenic was wasted, at least as regards the zinc plants. U.S. Pat. No. 3,979,266 discloses a process by which it is possible to lower considerably the copper concentration in the arsenide cementate, and consequently the cementate can be used as raw material in the production of cobalt and nickel. However, in principle this cementate causes the same problem as above. The arsenic content in the cementate substantially lowers the selling value of the cementate, while the arsenic present in the cementate is wasted as regards a zinc plant. Various processes have been introduced for the treatment of these cementates. U.S. Pat. No. 3,979,266 discloses a process of leaching the arsenic in sodium hydroxide and returning it as $As_2O_3$ to the solution purification, while the metals are recovered in the form of a hydroxide precipitate. The precipitate has, however, proved to be difficult to filter and wash. Finnish Lay-Open Print 770646 describes another process, in which the zinc, copper, and cobalt are first leached in acid and then a cobalt-rich precipitate is precipitated from this solution. The residue is then leached by means of alkali lye to remove the arsenic. The residue is a suitable raw material for the production of copper, and the arsenic is precipitated from the solution as copper arsenate, which is returned to solution purification.

There is also a prior known method for the treatment of arsenides, whereby arsenides are extracted by means of a sulfuric acid solution and the solution is thereafter evaporated so as to precipitate the metal sulfates and to recover the arsenic as a sulfuric acid-bearing $H_3AsO_4$ solution (Journal of the South African Institute of Mining and Metallurgy, July 1969, p. 654). It is, however, difficult to separate arsenic and metal sulfates effectively from each other by this process, since a very strong solution of sulfuric acid and arsenic acid must be used for a complete precipitation of the metal sulfates. This results in a very viscous solution, which complicates the separation and the washing of the crystal mass.

The object of the present invention is therefore to provide a process for the treatment of arsenic- and metal-bearing raw materials to produce a metal-free arsenic product and an arsenic-free metal sulfate, whereby the disadvantages involved in the previously known processes mentioned above are eliminated.

SUMMARY OF THE INVENTION

According to the invention, raw materials which contain arsenic and metal are leached at an elevated temperature and eventually under oxidizing conditions to convert the arsenic to a 5-valent form, whereafter the metal sulfates are crystallized out by cooling from a selectively separated arsenate-bearing aqueous solution, and arsenic is removed at least from a secondary flow of the aqueous solution before the aqueous flow is returned to the leaching operation.

DESCRIPTION OF THE PREFERRED EMBODIMENTS

In the process according to the invention it is not necessary to crystallize the metal sulfates completely out from the separated arsenate-bearing aqueous solution, firstly since a closed solution cycle is used, and secondly, since arsenic can be separated very selectively from the mother liquor after the crystallization. The removal of arsenic from this mother liquor need not be complete, either, since after the removal of arsenic the solution is returned to the leaching of raw material. Thus the present invention comprises the leaching of arsenic- and metal-bearing raw materials by means of an aqueous solution in a closed solution cycle which includes, in addition to the leach, two selective removal stages, one for metal sulfates and the other for arsenic.

The invention is described below in more detail with reference to the accompanying drawing, which depicts a flow diagram of the process according to the invention.

Arsenide precipitate is fed to the leaching stage, at which a suitable sulfuric acid concentration is maintained and oxygen is dispersed in the form of either gaseous oxygen or air into the aqueous solution. The sulfuric acid concentration is not critical for the success of the process, for it affects only the reaction velocity, but since a high sulfuric acid concentration enhances both the reaction velocity and the performance of both of the following removal stages, the sulfuric acid concentration is maintained at a rather high level, and approx. 100 g $H_2SO_4$/l has experimentally been found suitable. The leaching temperature is selected as one at which the solubility of the metal sulfates is maximal. Temperatures in the range of about 50°–100° C. are generally employed. In leaching a raw material in which the metals are copper and nickel, the temperature is preferably 90°–100° C., while the highest solubility of cobalt sulfate is at approx. 65°–70° C. When treating an arsenide precipitate from a zinc process, the precipitate containing all the three metals, the temperature is a compromise between the above-mentioned temperatures, depending on the predominant metal.

At the end of the leach the solution is cooled or the solution is allowed to cool as much as is practical. It can be cooled to approx. 30° C., for example, which is fully possible by means of generally available cooling water. Thereby the metal sulfates crystallize. Fresh sulfuric acid is added preferably to this stage of the solution cycle, since a high sulfuric acid concentration curbs the coprecipitation of arsenic with the sulfates, while more sulfates can be precipitated as their solubility lowers with increasing acid concentration. The sulfate crystals are removed by filtering, and then washed.

The next stage is arsenic removal, which can be performed by different methods. Two methods are described below, and the selection between them depends on the local conditions. It has been shown that $H_3AsO_4$ can very selectively be extracted by means of tributyl phosphate or dibutylbutyl phosphate from the solution obtained from the crystallization. The extraction is performed without adding any neutralizing agents or foreign chemicals. A high sulfuric acid concentration in the solution promotes, however, the extraction, and therefore the addition of fresh sulfuric acid to the crystallization stage is advantageous even at this stage. The extraction is performed using tributyl phosphate or dibutylbutyl phosphate dissolved in some suitable hydrocarbon to which some higher alcohol may have been added to enhance the separation of the phases. The stripping is performed with water. The extraction is easy to perform so that the output $H_3AsO_4$ solution contains at minimum 100 g As/l, and thereafter this solution can be returned to solution purification. Thus the arsenic can be kept in the aqueous solution throughout the process, which is highly hygienic.

In another method for the removal of arsenic, arsenate is reduced to arsenite, whereby the $As_2O_3$ precipitates. The reduction can be performed using, for example, sulfur dioxide. Thereafter the $As_2O_3$ can be returned to the solution purification, either as such or as an environmentally less hazardous $NaAsO_2$ solution, which is obtained by dissolving the precipitated $As_2O_3$ in sodium hydroxide after the mother liquor from the $As_2O_3$ precipitation has been removed by decanting.

Above, the process according to the invention has been described as applied to the treatment of arsenide cementate obtained from zinc plants. It is, however, evident, that even other raw materials can be treated by it. The main thing is that arsenic can be dissolved in a 5-valent form (=as arsenate) to make possible the selective crystallization of sulfates. If the arsenic is in a 3-valent form, the $As_2O_3$ coprecipitates with the crystals. Naturally, the raw material need not be arsenide, which is leachable under oxidizing conditions, but it can just as well as arsenate, which is extractable with sulfuric acid solution alone, without oxidation.

The metal sulfates obtained can be used as raw materials for the production of pure metals or pure metal salts. The arsenic obtained is also a valuable commodity, and especially if the arsenic has been removed by extraction, the $H_3AsO_4$ solution obtained after the evaporation of the solution is an excellent initial material for the production of saturation agents and pesticides.

The invention is described below in more detail with the aid of an example.

EXAMPLE

Precipitate obtained from the solution purification of the zinc process was leached as follows:

| | | |
|---|---|---|
| Solid content | = | 200 g/l |
| Temperature | = | 95° C. |
| Initial $H_2SO_4$ concentration | = | 300 g/l |
| Final $H_2SO_4$ concentration | = | 120 g/l |

Air was injected into the solution and dispersed well.

After six hours the color of the leach residue had turned white and the leach was discontinued. The results obtained:

| | Cu | Co | Ni | Zn | Cd | As | Pb | $H_2O_4$ |
|---|---|---|---|---|---|---|---|---|
| Precipitate before leach | 45.2 | 3.6 | 4.2 | 6.0 | 0.28 | 16.5 | 5.3 | % |
| Precipitate after leach | 0.14 | <0.025 | <0.025 | 0.13 | | 0.2 | 30 | " |
| Leaching yield | 99.9 | >99.9 | >99.9 | 99.6 | | 99.7 | — | " |
| Solution before leach | 28 | 17 | 27 | 36 | 2 | 120 | | 300 g/l |
| Solution after leach | 118 | 24 | 35 | 48 | 2.6 | 153 | | 120 g/l |

The solution fed into the leach had been obtained by running it a few times through the process according to the flow diagram shown in the figure, and thus the example illustrates the results obtained in a continuous-working process. Sulfuric acid was added to the solution at 200 g $H_2SO_4$/l, the solution was then cooled to 30° C. and maintained at this temperature for 6 hours. The crystals produced were removed by filtering and then washed with a small quantity of water (0.2 ml $H_2O$/1 g of precipitate). The following results were obtained:

| | Cu | Co | Ni | Zn | Cd | As | Pb | $H_2O_4$ |
|---|---|---|---|---|---|---|---|---|
| Solution before crystallization | 118 | 24 | 35 | 48 | 2.6 | 153 | — | 120 g/l |
| Solution after crystallization | 26 | 17 | 26 | 37 | 2.1 | 152 | — | 320 g/l |
| Precipitation Me | 102 | 100 | 113 | 92 | 83 | | | % |
| Leached Me Analysis of crystals | 18 | 1.4 | 1.7 | 2.4 | 0.1 | 0.1 | 2 | % |
| Coprecipitation of arsenic (calculated on the basis of arsenic content in the arsenide precipitate) | | | | | | 1.5 | | |

Half of the solution was extracted using tributyl phosphate.

In order to extract arsenic from the solution obtained from the crystallization of metal sulfates, an extraction agent was prepared which contained tributyl phosphate 85% by vol. and Shellsol K (an aliphatic hydrocarbon with a distillation range of 194°–251° C. and a specific weight of 0.79 g/cm$^3$) 15% by vol.

One part (by vol.) of the solution obtained from the crystallization and 1.4 parts (by vol.) of the tributyl phosphate solution used previously for the arsenic extraction in question and then regenerated with water were stirred for 5 minutes at 30° C. The separated organic phase obtained was stirred for an equal length of time at the same temperature with one tenth of its volume of water, whereafter the again separated organic phase was mixed in the same manner with half of its volume of water.

The analysis values of the aqueous solutions have been compiled in the table below.

|  | Cu | Co | Ni | Zn | Cd | As | Pb | $H_2SO_4$ |
|---|---|---|---|---|---|---|---|---|
|  |  |  |  | g/l |  |  |  |  |
| Solution after crystallization | 26 | 17 | 26 | 37 | 2.1 | 152 | — | 320 |
| Solution after extraction | 27 | 17 | 25 | 38 | 2.1 | 76 | — | 228 |
| Solution obtained by a phase volume ratio of 10 | 0.20 | 0.30 | 0.25 | 0.15 | 0.01 | 128 | — | 292 |
| Solution obtained by a phase volume ratio of 2 | 0.014 | 0.013 | 0.011 | 0.010 | 0.001 | 86 | — | 66 |

It can be seen from the table above that arsenic can be extracted highly selectively. The trace amounts of coextracted metals can be removed simply by washing the extraction agent with a small quantity of water.

On the other hand, considerable quantities of arsenic were coextracted. Calculations show that the separation factor $$S_{As,H_2SO_4} = C_{As}/C_{As}/C_{H_2SO_4}/C_{H_2SO_4}$$

where $C_{As}$ and $C_{H_2SO_4}$ are the concentrations of arsenic and sulfuric acid in the organic phase, $C_{As}$ and $C_{H_2SO_4}$ the concentrations of arsenic and sulfuric acid in the aqueous phase, is in the order of 2.5 for both the extraction and the water wash. For an expert it is thus evident that the extraction can be performed in such a manner that a nearly sulfate-free arsenic acid product is obtained. By a countercurrent extraction of the above sulfate solution in, for example, two extraction stages, and by a countercurrent wash in four washing stages, and by the combining of the obtained wash solution with the sulfate solution fed into the countercurrent extraction, an arsenic acid product is recovered which has a sulfate content of less than 10% of the arsenic content of the product. The extraction and wash experiment was repeated by the process described above, the only difference being that iron had been added to the sulfate solution in the form of ferric sulfate. The analysis showed that after the addition of iron the sulfate solution contained iron 25 g/l. Within the limits of the precision of the analysis, the extraction and wash results were the same as above. As regards iron, the results were:

| | |
|---|---|
| Solution after extraction | 24 g/l Fe |
| Wash solution obtained with a phase volume ratio of 10 | 2.2 g/l Fe |
| Wash solution obtained with a phase volume ratio of 2 | 0.16 g/l Fe |

The results show that in spite of the fact that iron dissolves at a somewhat higher rate than other metals experimented with, iron can also be removed effectively from the extraction agent by means of a small quantity of water. The possibility of obtaining an iron-free $H_3AsO_4$ product is significant in, for example, the production of arsenic-bearing saturation products and pesticides.

One half of the solution was fed into a reactor, where sulfur dioxide was injected through the solution, the temperature being maintained at 60° C.

After ten hours the $As^{5+}$ concentration had dropped to 26 g/l, and an $As_2O_3$ precipitate had been produced. The solution was cooled to 30° C. and the solution was removed by decanting. The solution, which contained NaOH 60 g/l, was fed into the reactor and stirred until the precipitate had dissolved completely. Before the leaching a sample was taken of $As_2O_3$, and this sample was washed with a small quantity of water.

Results:

|  | Cu | Co | Ni | Zn | Cd | $As^{5+}$ | $As^{3+}$ | $H_2SO_4$ |  |
|---|---|---|---|---|---|---|---|---|---|
| Solution before reduction | 28 | 17 | 27 | 36 | 2 | 220 | 3 | 300 | g/l |
| Solution after reduction | 28 | 17 | 27 | 36 | 2 | 26 | 7 | 405 | g/l |
| $As_2O_3$ yield |  |  |  |  |  | 88 |  | 5 | % |
| $As_2O_3$ analysis | 0.006 | 0.01 | 0.02 | 0.02 | 0.001 |  | 75.5 | 0.03 |  |
| Coprecipitation of metal as a percentage of the quantity entering the process | 0.01 | 0.3 | 0.5 | 0.3 | 0.3 |  | 588 |  |  |

The solution was returned to the leach of raw material.

As can be seen from the above, more arsenic was obtained from the solution as $As_2O_3$ then entered the leach. This means that only part of the solution needs to be fed through arsenic removal. Thus a high arsenic concentration can be stored in the solution by circulating it between the leach and the crystallization. This is advantageous for the next arsenic removal and in any case it is possible to obtain an arsenic-free metal sulfate.

What is claimed is:

1. A process for the treatment of raw materials which contain arsenic and metal to produce a metal-free arsenic product and an arsenic-free metal sulfate, comprising leaching the raw material with an aqueous solution of sulfuric acid at elevated temperature under oxidizing conditions; selectively separating an arsenate-bearing aqueous solution; cooling the solution to crystallize the metals as sulfates from the separated aqueous solution; separating the aqueous solution from the metal sulfate crystals; removing arsenic from at least part of the aqueous solution, and finally recycling the solution to the leach.

2. The process of claim 1, in which sulfuric acid is added to the solution cycle in such a quantity that the sulfuric acid concentration in the aqueous solution in the raw material leach is at least 100 g/l.

3. The process of claim 2, in which sulfuric acid is added to the solution is such a quantity that the sulfuric acid concentration in the aqueous solution in the raw material leach is 120–300 g/l.

4. The process of claim 1, in which the leach is performed at about 50°–100° C.

5. The process of claim 1, including dispersing air or oxygen into a mixture of an aqueous solution of sulfuric acid and metal arsenide to provide said oxidizing conditions in said leaching step.

6. The process of claim 1, in which the arsenic is removed from the arsenate-bearing aqueous solution by extracting the aqueous solution with tributyl phosphate or dibutylbutyl phosphate dissolved in hydrocarbon and by stripping the organic phase with water.

7. The process of claim 1, in which the arsenic is removed from the arsenate-bearing aqueous solution by reducing the arsenate to arsenite by means of sulfur dioxide at elevated temperature in order to precipitate and separate the arsenic as $As_2O_3$.

8. The process of claim 1, in which sulfuric acid is added to the solution cycle at the metal sulfate crystallization stage.

9. The process of claim 1, in which the metal is Cu or Ni, and including performing the leach at a temperature of about 90°–100° C.

10. The process of claim 1 in which the metal is Co, and including performing the leach at a temperature of about 65°–70° C.

* * * * *